(12) United States Patent
Shamasundar et al.

(10) Patent No.: US 10,446,039 B2
(45) Date of Patent: Oct. 15, 2019

(54) DISPLAY SYSTEMS AND METHODS FOR PREVENTING RUNWAY INCURSIONS

(71) Applicant: HONEYWELL INTERNATIONAL INC., Morris Plains, NJ (US)

(72) Inventors: Raghu Shamasundar, Bangalore (IN); Umesh Hosamani, Bangalore (IN); Mohan Gowda Chandrashekarappa, Bangalore (IN); Hariharan Saptharishi, Trichy (IN); Narayanan S, Chennai (IN); Kiran Mancheiah Venkataramana, Bangalore (IN); Kumar Kiran, Visakhapatnam (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 220 days.

(21) Appl. No.: 15/433,129

(22) Filed: Feb. 15, 2017

(65) Prior Publication Data
US 2018/0233052 A1    Aug. 16, 2018

(51) Int. Cl.
| | |
|---|---|
| G08G 5/00 | (2006.01) |
| G08G 5/02 | (2006.01) |
| G08G 5/06 | (2006.01) |
| G01C 23/00 | (2006.01) |
| G06T 11/60 | (2006.01) |
| G06F 3/14 | (2006.01) |
| G10L 15/26 | (2006.01) |

(52) U.S. Cl.
CPC ......... *G08G 5/0021* (2013.01); *G01C 23/005* (2013.01); *G08G 5/0013* (2013.01); *G08G 5/0078* (2013.01); *G08G 5/025* (2013.01); *G08G 5/06* (2013.01); *G08G 5/065* (2013.01); *G06F 3/14* (2013.01); *G06T 11/60* (2013.01); *G09G 2340/12* (2013.01); *G10L 15/26* (2013.01)

(58) Field of Classification Search
CPC .... G08G 5/0021; G08G 5/0078; G08G 5/025; G08G 5/06; G08G 5/065; G08G 5/0013; G01C 23/005; G09G 2340/12; G10L 15/26; G06F 3/14; G06T 11/60
See application file for complete search history.

(56) References Cited

U.S. PATENT DOCUMENTS

| | | | |
|---|---|---|---|
| 6,160,497 A | * | 12/2000 | Clark ........................ G01S 7/04 340/945 |
| 7,765,037 B2 | | 7/2010 | Bagge et al. |

(Continued)

FOREIGN PATENT DOCUMENTS

EP    2804167 A2    11/2014

OTHER PUBLICATIONS

Extended EP Search Report for Application No. 18156826.2 dated Nov. 30, 2018.

*Primary Examiner* — Jelani A Smith
*Assistant Examiner* — Majdi Alsomiri
(74) *Attorney, Agent, or Firm* — Lorenz & Kopf, LLP

(57) ABSTRACT

The present disclosure generally relates to display systems in the flight deck of an aircraft, and also to methods for providing such displays. More particularly, the displays and methods of the present disclosure are configured to integrate airport surface lighting information with information received from multiple air traffic control (ATC) communication channels, for purposes of increasing aircrew situational awareness and preventing runway incursions.

16 Claims, 11 Drawing Sheets

(56) References Cited

U.S. PATENT DOCUMENTS

| | | |
|---|---|---|
| 8,352,168 B2 | 1/2013 | Hedrick |
| 8,532,844 B2 | 9/2013 | Wilson et al. |
| 8,704,701 B2 | 4/2014 | Pschierer et al. |
| 8,773,288 B1* | 7/2014 | Carrico ............... G08G 5/0021 340/945 |
| 9,262,927 B2* | 2/2016 | Populus ............... G08G 5/0013 |
| 9,922,569 B2* | 3/2018 | Bilek ...................... H04W 4/40 |
| 10,102,760 B1* | 10/2018 | Foltan ................... G08G 5/045 |
| 10,275,427 B2* | 4/2019 | Saptharishi ........... B64D 43/00 |
| 10,297,159 B2* | 5/2019 | Srivastav ............ G08G 5/0021 |
| 2002/0077743 A1* | 6/2002 | Schmidt ............... G08G 5/0026 701/120 |
| 2003/0222795 A1* | 12/2003 | Holforty ............... B64D 43/00 340/968 |
| 2007/0288129 A1* | 12/2007 | Komer .................. G10L 15/26 701/3 |
| 2008/0045198 A1* | 2/2008 | Bhogal ............... G08G 5/0013 455/414.4 |
| 2008/0195309 A1* | 8/2008 | Prinzel, III ............ G01C 23/00 701/532 |
| 2009/0306887 A1* | 12/2009 | Clark .................... G01C 23/00 701/533 |
| 2010/0030400 A1 | 2/2010 | Komer et al. |
| 2010/0231705 A1* | 9/2010 | Yahav .................... G02B 27/01 348/115 |
| 2011/0291861 A1* | 12/2011 | Meunier ............... G08G 5/0008 340/945 |
| 2012/0022774 A1 | 1/2012 | Pinheiro et al. |
| 2013/0093612 A1 | 4/2013 | Pschierer et al. |
| 2014/0077975 A1 | 3/2014 | Khatwa et al. |
| 2014/0309915 A1* | 10/2014 | Beda ..................... G08G 5/065 701/120 |
| 2015/0364044 A1 | 12/2015 | Kashi et al. |
| 2016/0171899 A1* | 6/2016 | Depare ................. G08G 5/065 701/120 |

\* cited by examiner

DISPLAY SYSTEMS AND METHODS FOR PREVENTING RUNWAY INCURSIONS

TECHNICAL FIELD

The present disclosure generally relates to display systems in the flight deck of an aircraft, and also to methods for providing such displays. More particularly, the displays and methods of the present disclosure are configured to integrate airport surface lighting information with information received from multiple air traffic control (ATC) communication channels, for purposes of increasing aircrew situational awareness and preventing runway incursions.

BACKGROUND

With increasing air traffic, and increasingly busy airports, managing terminal area traffic both in the air and on the ground in a manner that is both safe and efficient is desirable. With regard to terminal area traffic, any unauthorized intrusion onto a runway, regardless of whether an aircraft presents a potential conflict or not, is deemed a runway incursion. Runway incursions continue to threaten aviation safety during takeoff, approach, and ground operations. Takeoff, approach, landing, and taxiway clearances are typically issued by an air traffic controller via a voice (radio) channel, in conjunction with airport signs and airport surface lighting, such as runway lights and taxiway lights. To assist in the safe and orderly flow of traffic, the airport surface lighting can be dynamically controlled to signal an aircraft concerning its clearance instructions. Though several autonomous systems exist today, human errors due to poor visibility, fatigue, lack of position awareness, misunderstood air traffic control (ATC) clearances, multiple or conflicting ATC clearances, or inadvertent flight-deck distractions remain a distinct possibility.

In the terminal area, an aircrew is constantly listening to ATC communications designated for the ownship and also surrounding traffic. These communications assist the aircrew in building a mental picture of the surrounding environment, and they also allow the aircrew to anticipate and comprehend the intended action to be taken by other aircraft in the area. At many airports, there exist various discrete radio communications frequencies for communications with various ATC positions, such as the ground controller, the tower (local) controller, and the approach controller. Based on the current phase of the flight mission (taxi, approach, takeoff, etc.), it is possible that different aircraft are interested in and are tuned to any of these communications channels. A safe taxi, takeoff, or landing requires careful coordination between different controllers and the aircrew of any aircraft in the area. In such a scenario, when a given runway is of interest to multiple aircraft for their current flight mission phase, it becomes difficult for the aircrew to measure the intent of the surrounding traffic, and it may also be risky for the aircrew to solely rely on ATC communications or surface lighting systems to execute the flight mission.

Accordingly, there is a need in the art for improved incursion detection systems and intuitive display systems, and aircraft display methods, that assist in reducing the incidence of runway incursions. These display methods should take into account both ground-based lighting systems and air traffic control communications on various air traffic control frequencies. It would thus be desirable to provide an autonomous system that can listen and correlate communications information from the various airport traffic controllers on their respective radio communications channels, and other sources, to present to the aircrew with an intuitive display of the runway status. Such a system undoubtedly would increase pilot efficiency, increase situational awareness, and improve safe and efficient terminal area operations by automatically processing voice instructions from multiple channel sources and identifying the relevant instructions affecting the ownship aircraft. The system should utilize all the benefits of voice communications and offer pilots with relevant and intuitive instructions, in the form of a flight deck display and alerting system, about possible conflicts or incursion threats for the safe execution of a flight mission. Furthermore, other desirable features and characteristics of the disclosure will become apparent from the subsequent detailed description and the appended claims, taken in conjunction with the accompanying drawings and this background of the disclosure.

BRIEF SUMMARY

Improved flight display systems, and methods for providing flight displays, are disclosed herein. The disclosed systems and methods synergistically utilize air traffic control (ATC) communications from multiple frequency channels and airport surface lighting information to generate a display and possible alerts for use by an aircrew of an aircrew to aide in situational awareness and prevent runway incursions. In one exemplary embodiment, a method for providing a flight display, optionally coupled with an alerting system, to an aircrew of an ownship aircraft, includes the steps (1) through (8) as follows: (1) receiving, at a multi-channel radio communications module of the ownship aircraft, at least a first voice transmission on a first radio frequency and a second voice transmission on a second radio frequency that is different than the first radio frequency, wherein the first and second radio frequencies are air traffic control frequencies selected from the group consisting of: a ground control frequency, a tower (local) control frequency, and an approach control frequency; (2) automatically, and without input from the aircrew, transcribing, using voice recognition techniques installed on the ownship aircraft, both the first and the second voice transmissions into an electronic, textual format, thereby generating a first transmission record and a second transmission record; (3) automatically, and without input from the aircrew, analyzing both of the first and second transmission records for an aircraft clearance, wherein the aircraft clearance pertains to an aircraft other than the ownship aircraft, and optionally to the ownship aircraft, and wherein the aircraft clearance is selected from the group consisting of: a takeoff clearance, a landing clearance, a runway crossing clearance, and a taxiing clearance; (4) receiving, at a synthetic vision system (SVS) of the ownship aircraft, a status indication of a ground-based clearance lighting feature in a vicinity or pathway of the ownship aircraft, wherein the ground-based clearance lighting feature is selected from the group consisting of: runway status lights (RWSL), final approach runway occupancy signal (FAROS) lights, runway entrance lights (REL), takeoff hold lights (THL), and runway intersection lights (RIL), or any other surface guidance lighting systems, and wherein the status indication is selected from the group consisting of: clear to proceed and not clear to proceed; (5) displaying, using the SVS, the status indication of the ground-based clearance lighting feature on a cockpit display to the aircrew of the ownship aircraft in the form of a graphical representation of the environment surrounding the ownship aircraft; (6) displaying, using the SVS, overlaid graphical symbology on the cockpit display corresponding to the status indication of the ground-based clearance lighting feature, wherein the overlaid graphical symbology indicates that the ownship aircraft is either clear to proceed or not clear to proceed, and wherein the overlaid graphical symbology is additional to and different from the display of the status indication of the ground-based lighting feature; (7) automatically, and without input from the aircrew, determining whether the aircraft clearance pertaining to the aircraft other than the ownship aircraft conflicts with the status indication of the ground-based clearance lighting feature; and (8) if there is determined to be a conflict and if the status indication is clear to proceed, automatically and without input from the aircrew, using the SVS, modifying the overlaid graphical symbology to indicate that the ownship aircraft is not clear to proceed; however, if there is not determined to be a conflict or if the status indication is not clear to proceed, maintaining the overlaid graphical symbology in its current state without modification.

This summary is provided to describe select concepts in a simplified form that are further described in the Detailed Description. This summary is not intended to identify key or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein.

DETAILED DESCRIPTION

Figure 1:
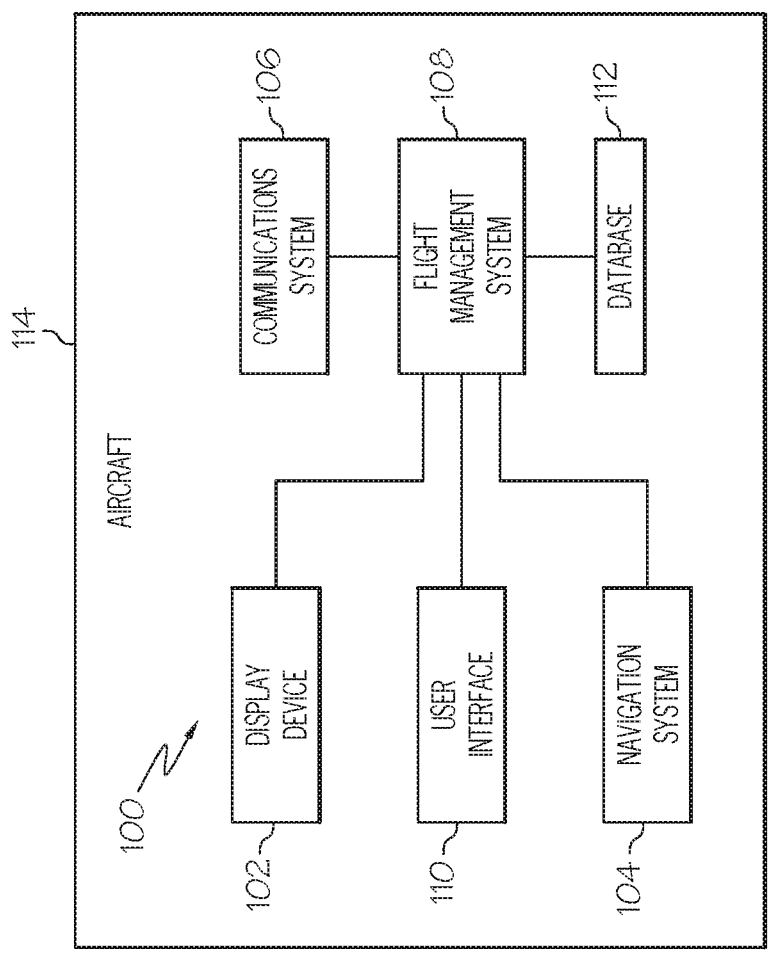
FIG. 1 is a system diagram illustrating an aircraft display system in accordance with the present disclosure.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention, which is defined by the claims. Furthermore, there is no intention to be bound by any expressed or implied theory presented in the preceding technical field, background, brief summary, or the following detailed description.

The present disclosure provides the displays and methods that are configured to integrate airport surface lighting information with information received from multiple air traffic control (ATC) communication channels, for purposes of increasing aircrew situational awareness and preventing runway incursions. For safe runway operations, Runway Status Lights (RWSL) and Final Approach Runway Occupancy Signal (FAROS) have been and are currently being deployed at major airports to reduce the risk of runway incursions. RWSL and FAROS are surveillance-driven and provide a direct lighting presentation to the aircrew of an aircraft indicating when it is unsafe to enter the runway via runway entrance lights (RELs), when it is unsafe to depart via takeoff hold lights (THLs), when it is unsafe to cross a runway intersection via runway intersection lights (RILs), and when it is unsafe to land via FAROS. Presentation of these airport surface lighting systems, on flight deck synthetic visions display systems, provides redundancy for the aircrew to be aware of the RWSL/FAROS lighting presentation. One inherent limitation of these current systems, however, is that the RWSL/FAROS lights are not operated based on coordinated clearance information from the various air traffic controllers whose communications and instructions to aircraft may affect the status of the runway in question.

As such, the present disclosure provides system and methods that serve to increase situational awareness of the aircrew concerning the runway in question by simulating the RWSL/FAROS lighting on flight deck synthetic vision display systems and augmenting such simulation by integrating the clearance messages issued by the ATC across the various applicable communication channels. As such, as opposed to synthetic vision systems that only provide a visualization of the status of the external surface lighting systems on flight deck display systems, the systems and methods of the present disclosure provide enhancements that allow for additional runway incursion/conflict information to be displayed intuitively on flight deck display systems by intelligently processing the multiple ATC communication radio channels.

A first aspect of the present disclosure, therefore, is a system/method for providing a flight display, optionally coupled with an alerting system, to an aircrew of an ownship aircraft. In particular, FIG. 1 depicts an exemplary embodiment of a display system 100, which may be located onboard ownship aircraft 114. This embodiment of display system 100 may include, without limitation, a display device 102, a navigation system 104, a communications system 106, and a flight management system (FMS) 108. The display system 100 further includes a user interface 110 for enabling interactivity with the display system 100 and a database 112 suitably configured to support operation of the display system 100, as described in greater detail below. It should be understood that FIG. 1 is a simplified representation of a display system 100 for purposes of explanation and ease of description, and FIG. 1 is not intended to limit the application or scope of the subject matter in any way. In practice, the display system 100 and/or aircraft 114 will include numerous other devices and components for providing additional functions and features, as will be appreciated in the art.

In an exemplary embodiment, the display device 102 is coupled to the flight management system 108, and the flight management system 108 is configured to display, render, or otherwise convey one or more graphical representations or images associated with operation of the aircraft 114 on the display device 102, as described in greater detail below. The flight management system 108 is coupled to the navigation system 104 for obtaining real-time data and/or information regarding operation of the aircraft 114 to support operation of the flight management system 108, for example including geographical coordinates, altitude, and airspeed, among others. In an exemplary embodiment, the user interface 110 is coupled to the flight management system 108, and the user interface 110 and the flight management system 108 are configured to allow a user to interact with the display device 102 and other elements of display system 100, as described in greater detail below. The communications system 106 is coupled to the flight management system 108 and configured to support communications between the aircraft 114 and another aircraft or ground location (e.g., air traffic control), as will be appreciated in the art. The communications system 106 is configured to transmit and receive signals on multiple discrete frequencies simultaneously and autonomously to support the operation of embodiments of the present disclosure.

In an exemplary embodiment, the display device 102 is realized as an electronic display configured to graphically display flight information or other data associated with operation of the aircraft 114 under control of the flight management system 108, as will be understood. In an exemplary embodiment, the display device 102 is located within a flight deck/cockpit of the aircraft 114. It will be appreciated that although FIG. 1 shows a single display device 102, in practice, additional display devices may be present onboard the aircraft 114. The user interface 110 may also be located within the cockpit of the aircraft 114 and adapted to allow a user (e.g., pilot, co-pilot, or other aircrew member) to interact with the flight management system 108, as described in greater detail below. In various embodiments, the user interface 110 may be realized as a keypad, touchpad, keyboard, mouse, touchscreen, joystick, microphone, or another suitable device adapted to receive input from a user. In an exemplary embodiment, the user interface 110 and flight management system 108 are cooperatively configured to enable a user to indicate, select, or otherwise manipulate one or more pop-up menus displayed on the display device 102, as described below. It should also be appreciated that the display systems under consideration are described as cockpit display systems for exemplary purposes. However, such integrated displays providing runway status lighting and clearance information can be made available on mobile or non-primary cockpit display systems like the electronic flight bag (EFB) or even on the non-cockpit display systems.

In an exemplary embodiment, the navigation system 104 is configured to obtain one or more navigational parameters associated with operation of the aircraft 114. The navigation system 104 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 104, as will be appreciated in the art. In an exemplary embodiment, the navigation system 104 is capable of obtaining and/or determining the current location of the aircraft 114 (e.g., with reference to a standardized geographical coordinate system) and the heading of the aircraft 114 (i.e., the direction the aircraft is traveling in relative to some reference) and providing these navigational parameters to the flight management system 108.

In an exemplary embodiment, the communications system 106 is configured to support communications between the aircraft 114 and another aircraft or ground location (e.g., air traffic control). In this regard, the communications system 106 may be realized using a radio communication system or another suitable data link system. In accordance with one embodiment, the communications system 106 includes multiple radios configured to be tuned for an identified radio communication frequency, as will be appreciated in the art and described in greater detail below.

In an exemplary embodiment, the flight management system 108 (or, alternatively, a flight management computer) is located onboard the aircraft 114. Although FIG. 1 is a simplified representation of display system 100, in practice, the flight management system 108 may be coupled to one or more additional modules or components as necessary to support navigation, flight planning, and other aircraft control functions in a conventional manner. In addition, the flight management system 108 may include or otherwise access a terrain database, navigational database (that includes airport diagrams, STAR, SID, and en route procedures, for example), geopolitical database, taxi database, or other information for rendering a navigational map or other content on the display device 102, as described below. In this regard, the navigational map may be based on one or more airport diagrams, sectional charts, topographic maps, digital maps, or any other suitable commercial or military database or map, as will be appreciated in the art.

In an exemplary embodiment, the flight management system 108 accesses or includes a database 112 that contains procedure information for a plurality of airports. As used herein, procedure information should be understood as a set of operating parameters or instructions associated with a particular action (e.g., landing, take off, taxiing) that may be undertaken by the aircraft 114 at a particular airport. In this regard, an airport should be understood as referring to a location suitable for landing (or arrival) and/or takeoff (or departure) of an aircraft, such as, for example, airports, runways, landing strips, and other suitable landing and/or departure locations. The database 112 maintains the association of the procedure information and the corresponding airport.

In some embodiments, the display system 100 may be configured as, or to include, a synthetic vision system (SVS). As may be recognized in the art, many aircraft are equipped with one or more vision enhancing systems. Such vision enhancing systems are designed and configured to assist a pilot when flying in conditions that diminish the view from the cockpit. One example of a vision enhancing system is known as a synthetic vision system (hereinafter, "SVS"). As used herein, the term "synthetic vision system" refers to a system that provides computer-generated images of the external scene topography from the perspective of the flight deck, derived from aircraft attitude, high-precision navigation solution, and database of terrain, obstacles, and relevant cultural features. A synthetic vision system is an electronic means to display a synthetic vision depiction of the external scene topography to the flight crew. Synthetic vision creates an image relative to terrain and airport within the limits of the navigation source capabilities (position, altitude, heading, track, and the database limitations). The application of synthetic vision systems is through a primary flight display from the perspective of the flight deck or through a secondary flight display. A typical SVS is configured to work in conjunction with a position determining unit associated with the aircraft as well as dynamic sensors that sense aircraft altitude, heading, and orientation. The SVS includes or accesses a database containing information relating to the topography along the aircraft's flight path, such as information relating to the terrain and known man-made and natural obstacles proximate the aircraft flight path. The SVS receives inputs from the position determining unit indicative of the aircraft location and also receives inputs from the dynamic sensors. The SVS is configured to utilize the position, heading, altitude, and orientation information and the topographical information contained in the database, and generate a three-dimensional image that shows the topographical environment through which the aircraft is flying from the perspective of a person sitting in the cockpit of the aircraft. The three-dimensional image (also referred to herein as an "SVS image") may be displayed to the pilot on any suitable display unit accessible to the pilot. The SVS image includes features that are graphically rendered including, without limitation, a synthetic perspective view of terrain and obstacles located proximate the aircraft's flight path. Using a SVS, the pilot can look at a display screen of the display unit to gain an understanding of the three-dimensional topographical environment through which the aircraft is flying and can also see what lies ahead. The pilot can also look at the display screen to determine aircraft proximity to one or more obstacles proximate the flight path.

In a further aspect of the present disclosure, the disclosed system/method is configured for receiving, at a multi-channel radio communications module 106 of the ownship aircraft, at least a first voice transmission on a first radio frequency and a second voice transmission on a second radio frequency that is different than the first radio frequency. Thus, while at least two voice transmissions on two different frequencies are received, the present disclosure is not limited to two: rather, it should be appreciated that three, four, or more communications radios may be provided on ownship aircraft 114, corresponding to the same number of possible frequencies to monitor. Moreover, at the ownship 114, ATC communications may be received by other than voice communications, such as controller-pilot data link communications (CPDLC), as is known in the art. In the terminal area, the above-noted first and second radio frequencies are air traffic control frequencies selected from the group consisting of: a ground control frequency, a tower (local) control frequency, and an approach control frequency. At a given airport, there may be multiple frequencies for each of the above ATC positions, and as such, the radio 106 may be set to monitor two tower frequencies, two approach control frequencies, and the like, in addition or as an alternative to monitoring any other ATC frequencies.

Figure 2:
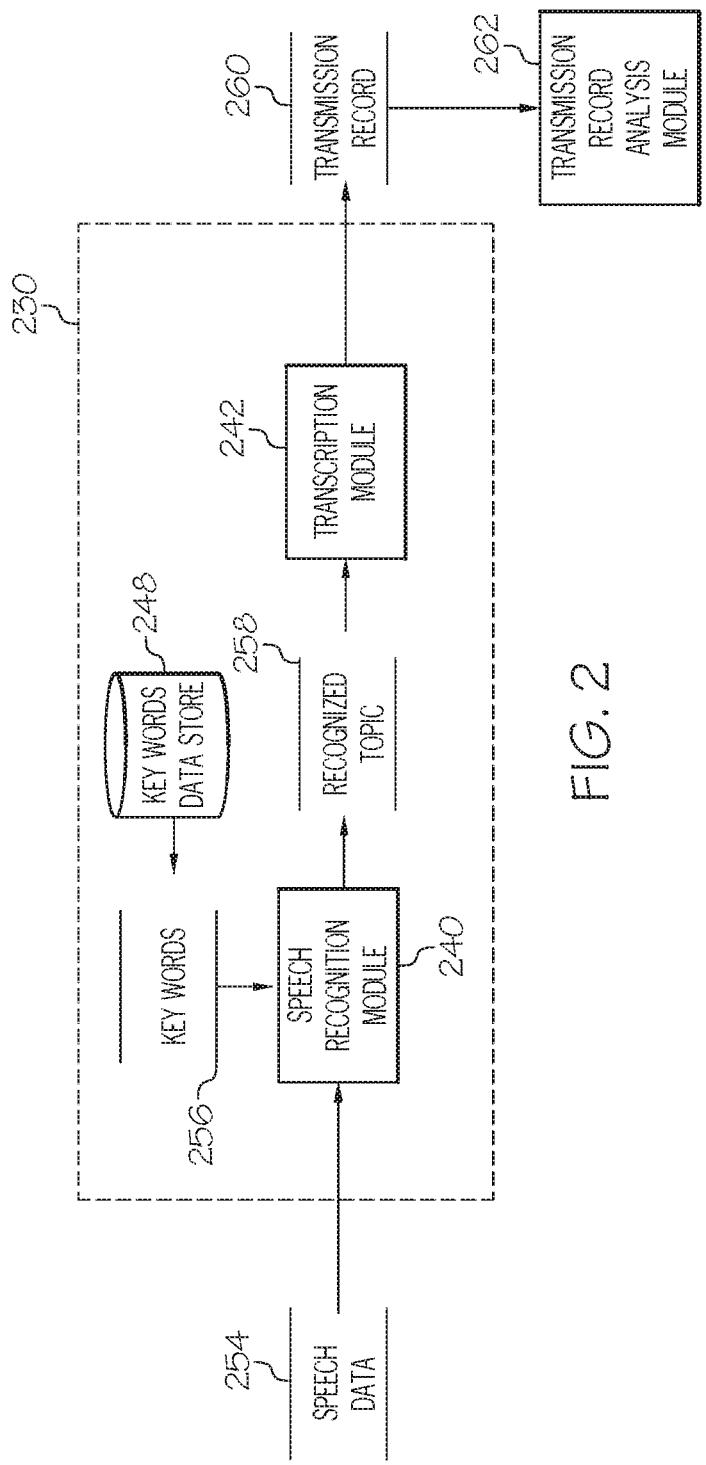
FIG. 2 is a system diagram illustrating a voice recognition system in accordance with the present disclosure.

In a further aspect of the present disclosure, the systems/methods may be configured for automatically, and without input from the aircrew, transcribing, using voice recognition techniques installed on the ownship aircraft, both the first and the second voice transmissions into an electronic, textual format, thereby generating a first transmission record and a second transmission record. As such, FIG. 2 provides exemplary embodiments of a speech processing system that is configured to receive and process speech input from an ATC communications channel A speech processing module 230 generally captures and processes speech from the ATC communications channel. Various embodiments of speech processing modules 230 according to the present disclosure may include any number of sub-modules embedded within the speech processing module 230. As can be appreciated, the sub-modules shown in FIG. 2 may be combined and/or further partitioned to process speech. The inputs to the speech processing module 230 may be received from other modules (not shown), determined/modeled by other sub-modules (not shown) within the speech processing module 230, and/or received from the communications system 106. In various embodiments, the speech processing module 230 includes a speech recognition module 240, a speech understanding module 242, a data capture module 244, and a key words datastore 248.

The speech recognition module 240 receives as input speech data 254 that includes speech spoken by air traffic controllers and that was received at ownship aircraft 114 via communications system 106. The speech recognition module 240 processes the speech data 254 based on one or more speech recognition techniques known in the art to recognize words spoken by ATC. The speech recognition module 240 further processes the recognized words for specific key words 256. In various embodiments, the key words 256 may be learned (e.g., in real time or by processing data offline) and stored in the key words datastore 248. In various embodiments, the key words 256 are words that typically involve terminal area clearance instructions issued from ATC to an aircraft, such as taxi clearances, runway crossing clearances, takeoff clearances, landing clearance, and approach clearances. If in fact a key word or words 256 is identified within the speech data 254, a recognized topic 258 (e.g., the one or more sentences containing the key word or words 256) is presented to the speech transcription module 242 for further processing. If, however, no key words are identified in the speech data 254, the speech data 254 and/or the recognized speech may be discarded or logged but need not be further processed. The speech transcription module 242 creates a textual record of the ATC communication, which is produced as transmission record 260.

Based on the speech recognition as described above, as further aspect of the presently disclosure is that the systems/methods are configured for automatically, and without input from the aircrew, analyzing both of the first and second transmission records for an aircraft clearance, wherein the aircraft clearance pertains to an aircraft other than the ownship aircraft, and optionally to the ownship aircraft. In the terminal area, it will be appreciated that the aircraft clearance is typically selected from the group consisting of: a takeoff clearance, a landing clearance, a runway crossing clearance, and a taxiing clearance. With continued reference to FIG. 2, transmission record 260 is analyzed by transmission record analysis module 262, which identifies a particular aircraft (either the ownship aircraft or another aircraft in the terminal area) and any associated clearance instruction that was given to such aircraft. Thus, from each transmission record 260 is deduced a specific aircraft and a specific clearance pertaining to that aircraft.

In some embodiments of the present disclosure, the display may be implemented in accordance with an SVS. Accordingly, in a further aspect, the systems/methods may be configured for receiving, at the synthetic vision system of the ownship aircraft, a status indication of a ground-based clearance lighting feature in a vicinity or pathway of the ownship aircraft. For this purpose, the SVS of the ownship aircraft may be operative coupled with one or more sensors adapted for mounting to an aircraft and configured to detect a light signature originating from outside the aircraft, including for example the light signature emitted from an airport surface lighting feature located on the ground on the surface area of an airport. The sensor may include a visible low light television camera, an infrared camera, and millimeter wave (MMW) camera or any other light sensing device capable of detecting light either within, or outside of the visible spectrum. The light signature may include any light that is projected from an airport surface lighting feature.

Figure 3:
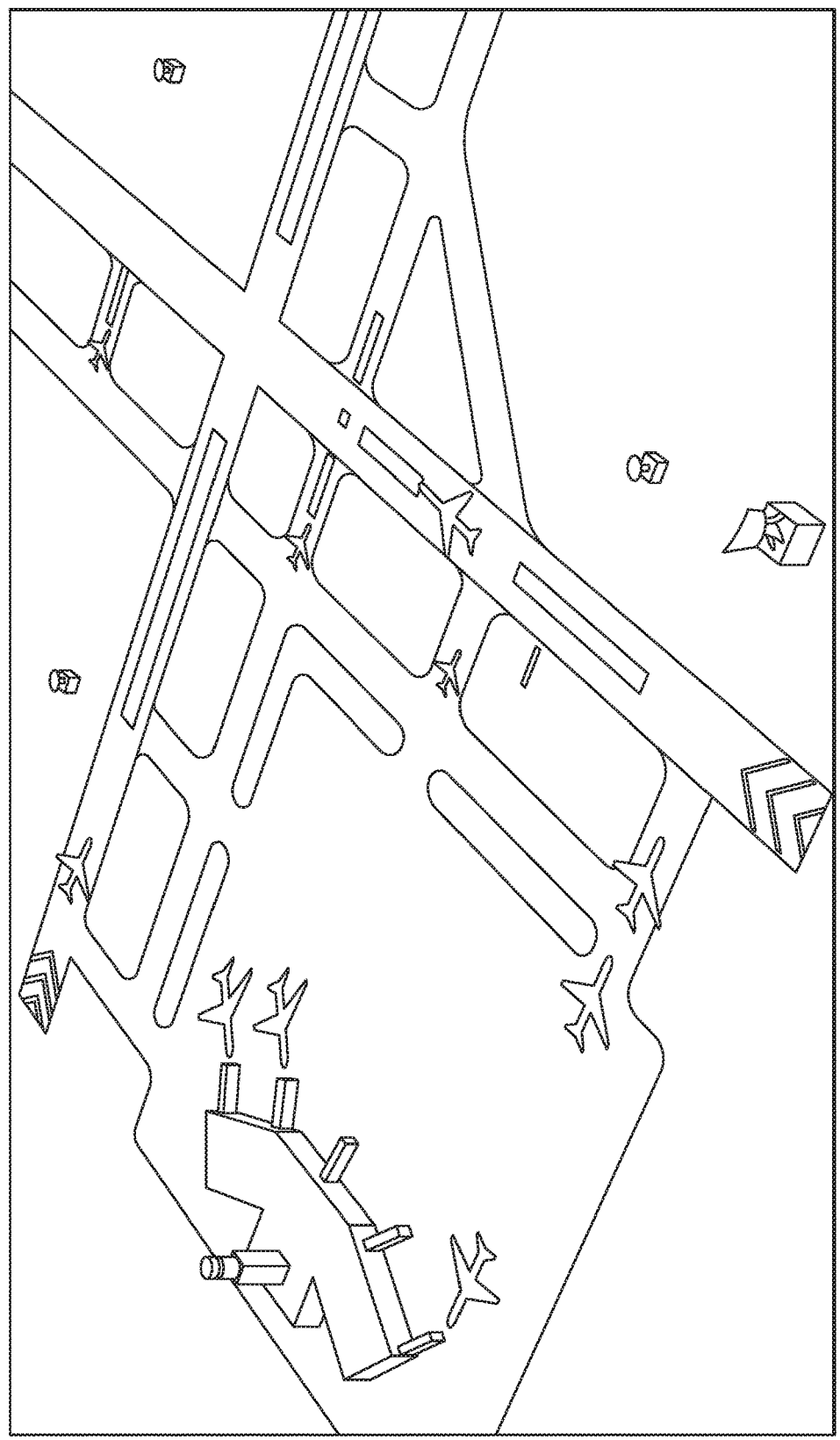
FIG. 3 provides an illustration and description of various surface lighting systems that may be available at an airport.

As will be appreciated, the ground-based clearance lighting feature may be selected from the group consisting of: runway status lights (RWSL), final approach runway occupancy signal (FAROS) lights, runway entrance lights (REL), takeoff hold lights (THL), and runway intersection lights (RIL). Referring now to FIG. 3, an exemplary airport surface lighting configuration is illustrated for purposes of understanding, and this disclosure should not be considered limited to any particular lighting configuration. As shown in FIG. 3, RWSL is a fully automated system that provides runway status information to pilots and surface vehicle operators to clearly indicate when it is unsafe to enter, cross, takeoff from, or land on a runway. The RWSL system may be ATC operated, and/or it may process information from surveillance systems and activates REL, THL, RIL, and FAROS in accordance with the position and velocity of the detected surface traffic and approach traffic. REL, THL, and RIL are in-pavement light fixtures that are directly visible to pilots and surface vehicle operators. FAROS alerts arriving pilots that the approaching runway is occupied by flashing the precision approach path indicator (PAPI). For any of these lighting systems, their status indication is selected from the group consisting of: clear to proceed and not clear to proceed.

Figure 4:
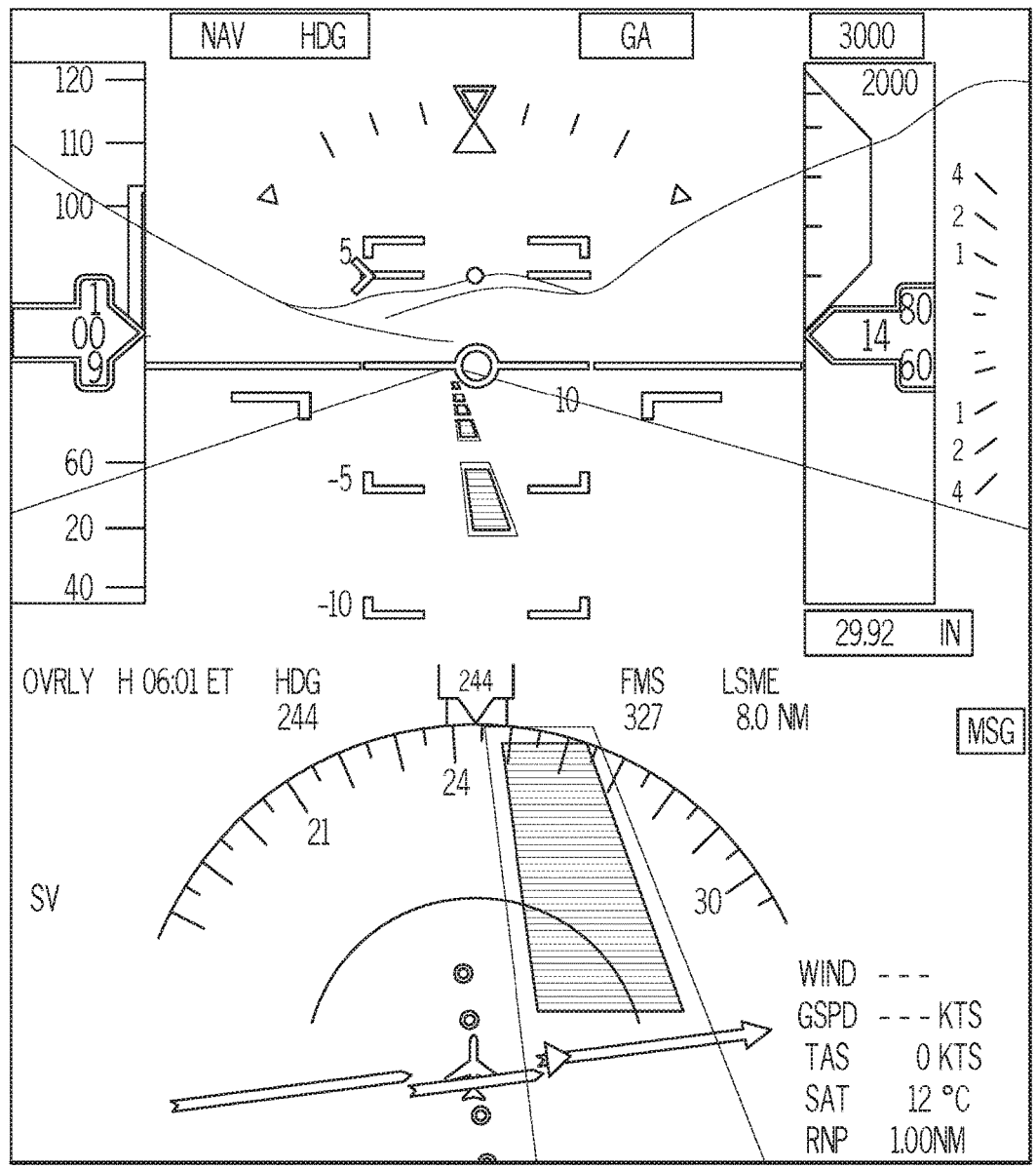
FIG. 4 provides a synthetic vision system (SVS) display as may be presented to the aircrew of an aircraft, incorporating the display of an illuminated surface lighting system.

In a further aspect of the present disclosure, the systems/methods may be configured for displaying, using the SVS, the status indication of the ground-based clearance lighting feature on the cockpit display device 102 to the aircrew of the ownship aircraft 114 in the form of a graphical representation of the environment surrounding the ownship aircraft. For example, in one embodiment, as shown in FIG. 4, the aircraft sensors have sensed red RWSL, which is indicative of not being clear to proceed. These red lights are displayed on the SVS of the ownship aircraft 114, which alerts the aircrew to the fact that it is not clear to proceed. In the opposite case, the RWLS would not be illuminated, the same would be shown on the SVS, giving the aircrew an indication that it would be clear to proceed.

As initially noted above, the present disclosure provides and enhancement and augmentation to conventional SVS that are only capable of displaying to the aircrew the current status of the RWLS or FAROS, as the case may be. Accordingly, the systems/methods may be configured for automatically, and without input from the aircrew, determining whether the aircraft clearance pertaining to the aircraft other than the ownship aircraft conflicts with the status indication of the ground-based clearance lighting feature. As described above, the clearance directed at another aircraft may be received by one of the ATC communication radios, and transcribed and analyzed for clearance information specific to the other aircraft. It thus become possible to compare (using a processor on board the aircraft, for example) whether RWLS/FAROS information received at the SVS is in any way conflicting with the clearance directed at the other aircraft. Such conflicting clearance would be the result of the ownship aircraft and the other aircraft being cleared to occupy the same runway at the same time. Examples would include where the SVS observes that RWLS/FAROS indicates clear to proceed (not lighted or not flashing) with respect to a runway, yet, on a monitored ATC frequency, a transcribed/analyzed transmission record was received indicating a concurrent clearance for another aircraft to occupy the runway (taxi, takeoff, land, cross, etc.). In such a situation, a runway incursion may be the likely result.

Figure 5:
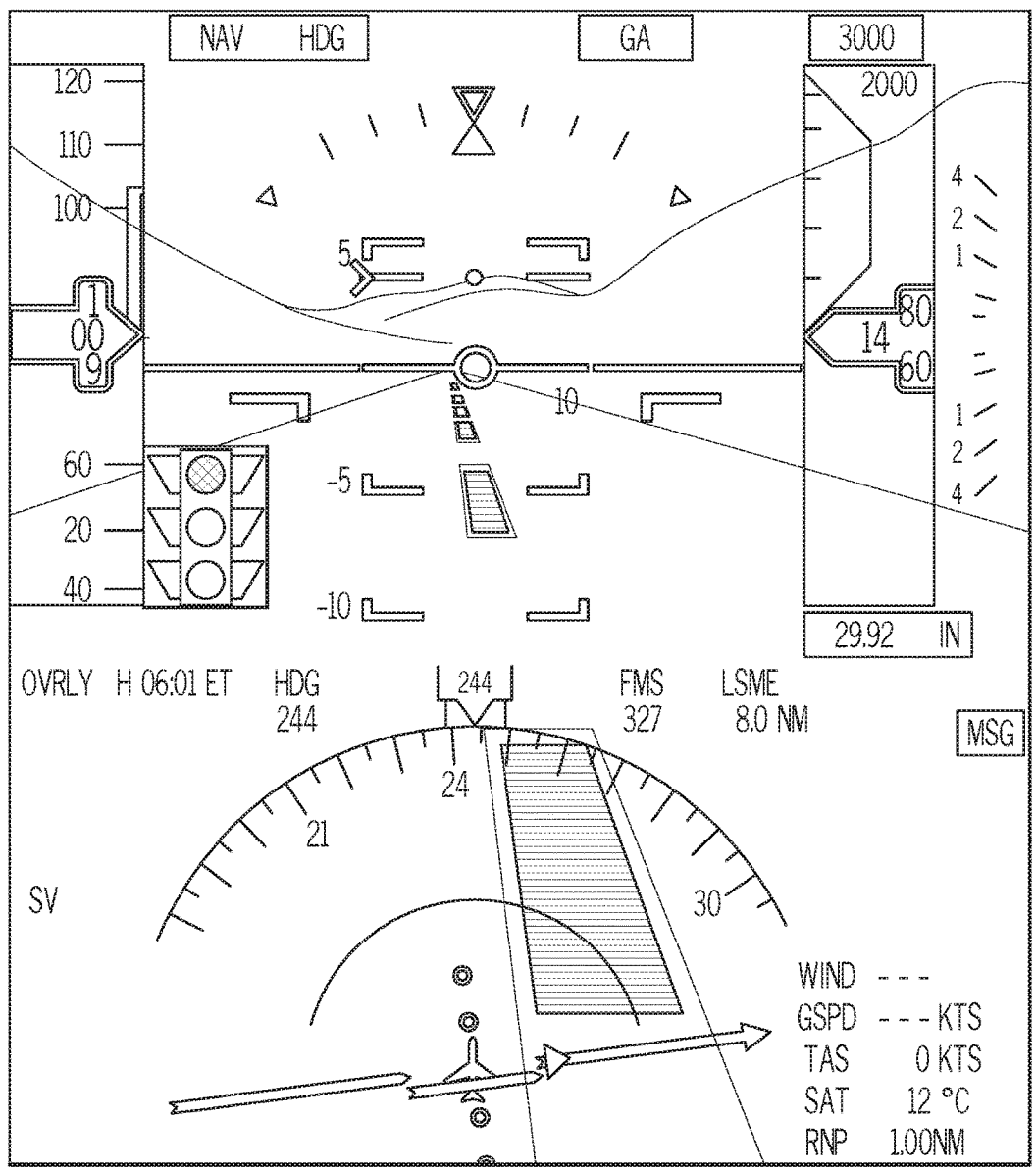
FIGS. 5-7 provide forward-looking SVS use cases in accordance with some embodiments of the present disclosure.

Therefore, it would be desirable to use the SVS to display an additional, different symbology, as compared to the conventional view of the RWLS/FAROS, which, in an appropriate case, is capable of calling attention to, or alerting, the aircrew that a runway incursion could occur if they proceed according to a non-illuminate RWLS or non-flashing FAROS. This additional, different symbology may take a variety of forms. One possibility is the use of "stoplight"-type symbology, as shown in FIG. 5. Thus, as compared with FIG. 4, the SVS shown in FIG. 5 has been augmented to include the additional, different symbology concerning the runway status. Of course, in FIG. 5, because the RWLS is illuminated, the stoplight symbology is also indicating "stop," providing an additional visual cue or alert that the ownship aircraft 114 is not clear to proceed. Thus, the methods/systems of the disclosure are additionally configured for displaying, using the SVS, graphical symbology on the cockpit display corresponding to the status indication of the ground-based clearance lighting feature, wherein the graphical symbology indicates that the ownship aircraft is either clear to proceed or not clear to proceed, and wherein the graphical symbology is different than the display of the status indication of the ground-based lighting feature.

The combined display on the SVS of the surface lighting feature status (lighted, unlighted, flashing, not flashing) in conjunction with the difference, additional graphical symbology finds great usefulness when, for whatever reason, the surface lighting feature indicates "clear to proceed," yet, having automatically been monitoring the ATC communication channels, the system is aware that another aircraft has a simultaneous clearance concerning the same runway. In such a case, although the SVS would, through its sensors, perceive the RWLS/FAROS to be non-activate, the additional, different (e.g., stoplight) symbology would present with "stop," or similar, providing an immediate visual cue and alert to the aircrew that something is amiss, and that they should not proceed until further clarification can be gained from ATC. Thus, in embodiments, the methods/systems are configured such that if there is determined to be a conflict and if the status indication is clear to proceed, automatically and without input from the aircrew, using the SVS, modifying the graphical symbology to indicate that the ownship aircraft is not clear to proceed; however, if there is not determined to be a conflict or if the status indication is not clear to proceed, maintaining the graphical symbology in its current state without modification.

Various use cases for the present systems/methods may be envisaged, as described in greater detail below in connection with FIGS. 5-10. First, with reference back to FIG. 5, consider for example an aircraft on a runway, wherein the aircraft has not been cleared for takeoff by the tower/local ATC controller, possibly owing to the fact that another aircraft or some equipment is occupying or crossing the runway. The runway status lights as shown to the aircrew on the SVS will be RED, indicating that the aircraft is not cleared for takeoff on the runway. In such a scenario, the additional, different symbology displayed, i.e., the incursion or traffic indicator (which, as shown, may be in the form of a stoplight or other convenient symbology) overlaid on the SVS will indicate a RED light indicating a STOP command, which matches with the runway status lights shown on the SVS.

Figure 6:
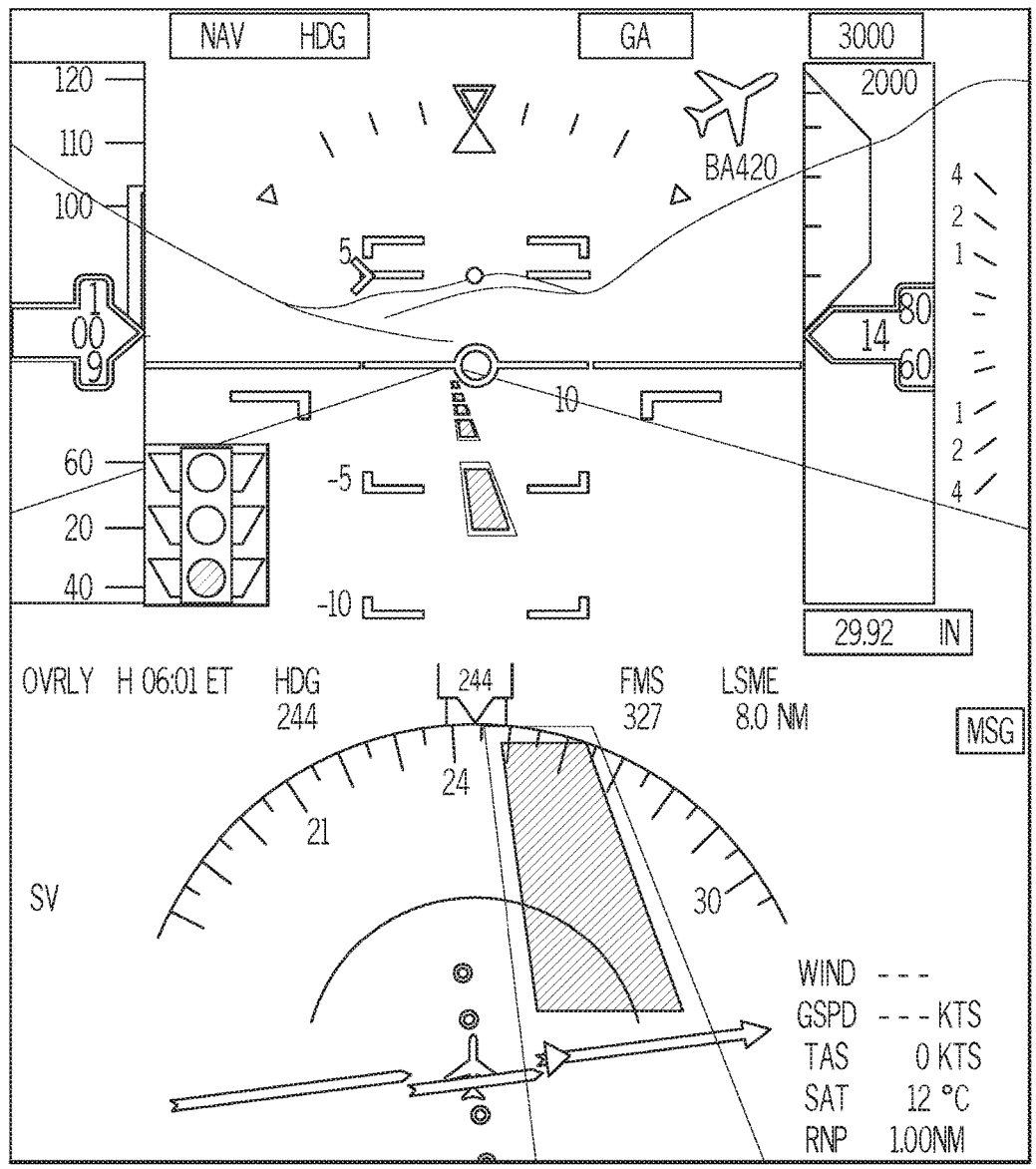

Next, with regard to FIG. 6, similarly, if the runway status lights are OFF (note previously departing aircraft "BA420" having cleared the runway after takeoff), indicating that the aircraft is cleared for takeoff and no conflict is detected by the system of this disclosure, monitoring the multiple ATC communication channels, the incursion or traffic indicator overlaid on the SVS system will indicate a GREEN light indicating a CLEAR command. Accordingly, FIGS. 5 and 6 provide base-case use illustrations, where the SVS surface lighting indication and the additional, different symbology overlaid on the SVS are consistent with one another, thus indicating no conflict as detected through the system's monitoring of multiple radio frequencies.

Figure 7:
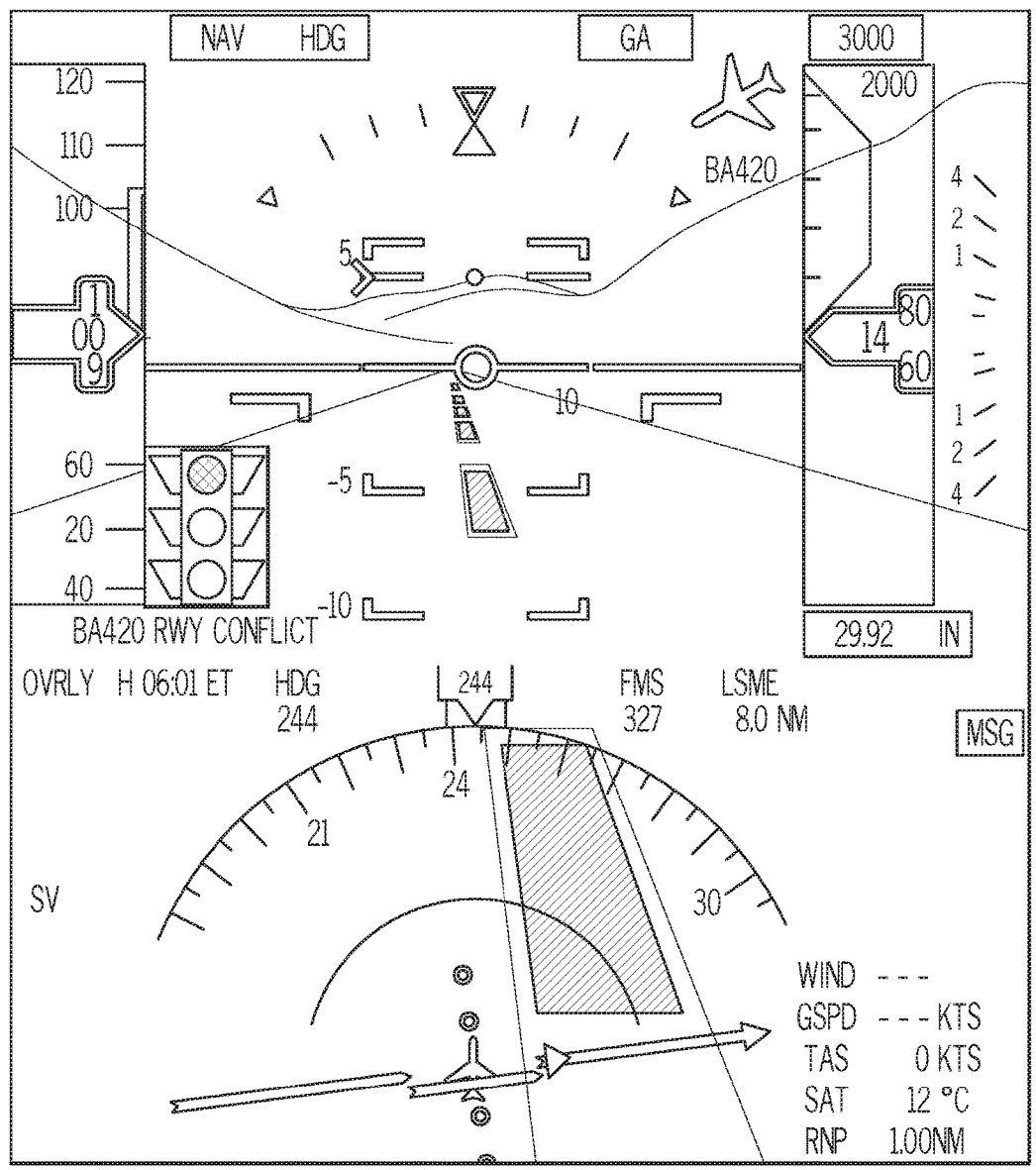

Next, with regard to FIG. 7, consider for example an aircraft on a runway, where that aircraft has been cleared for takeoff by the tower/local controller. The runway status lights will be OFF indicating that the aircraft is cleared for takeoff on the runway. However the intelligent runway incursion system monitoring the multiple ATC communication frequencies has stored and analyzed a transmission record for another aircraft ("BA420") and thereby detects a possible incursion and conflict due another controller having cleared the other aircraft for landing (or ground equipment crossing the runway) at the same time. In such a scenario, the incursion or traffic indicator on the SVS system will indicate a RED light indicating a STOP command, while the sensors coupled with the SVS continue to detect no illumination from the RWLS. The RED or STOP command on the incursion indicator will alert the aircrew of a possible conflict and additional information of the conflicting traffic could be alerted on the display system. The aircrew may then consult with ATC for conflict resolution.

Figure 8:
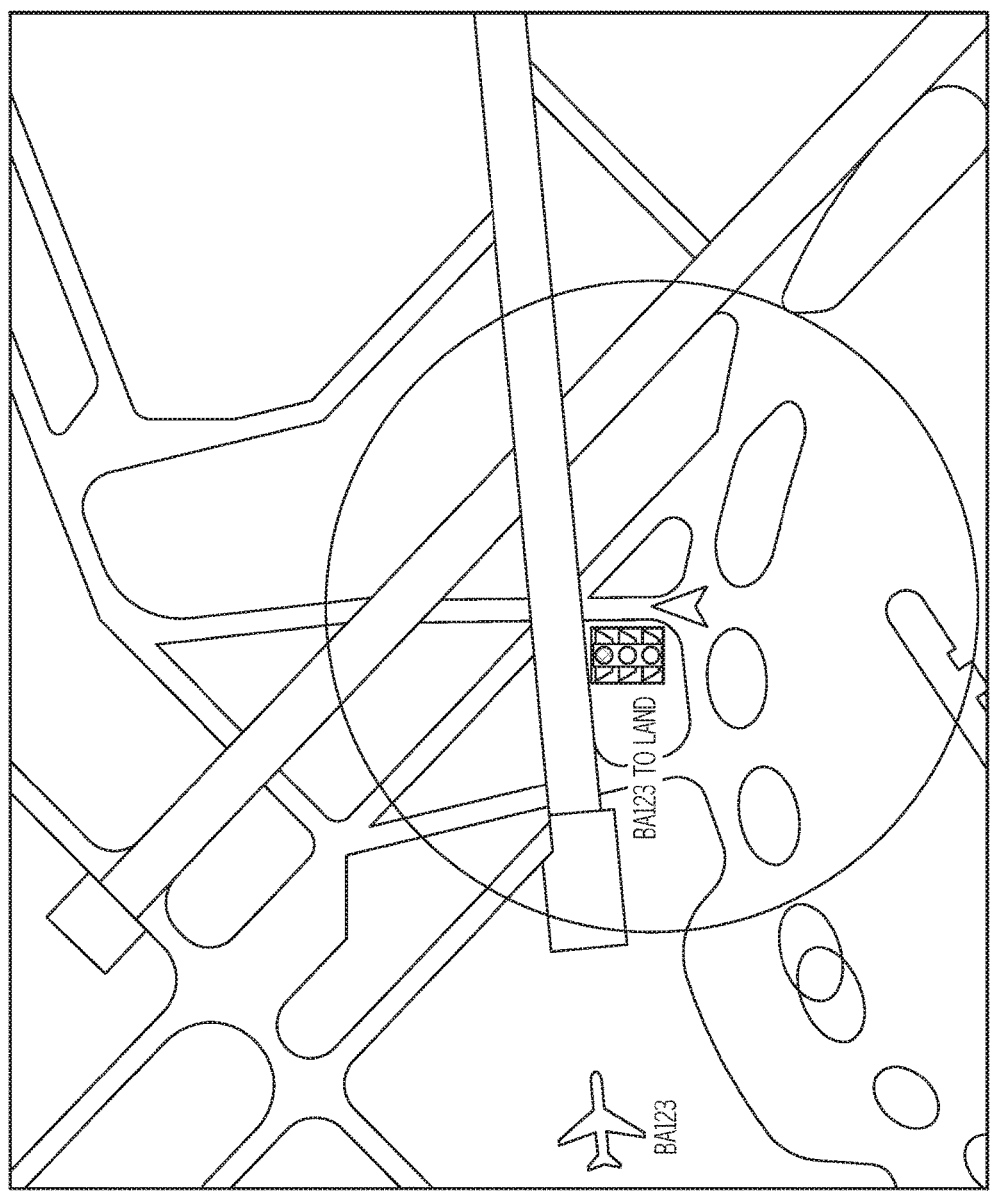
FIGS. 8-10 provide airport moving map SVS use cases in accordance with some embodiments of the present disclosure.

In accordance with the present disclosure, a similar symbology and mechanism may be applied for aircraft taxiing with the aid of an airport surface moving map with synthetic runway entrance lights. Attention is directed to FIG. 8. Consider for example another aircraft ("BA123") having been cleared for landing by a tower/local controller (the RELs showing on the moving map as non-illuminated). At the same time, the ownship aircraft is crossing the runway, having been cleared to do so by and in communication with a ground controller. By autonomously monitoring multiple ATC communication channels, the system of this disclosure is capable of detecting the conflict and alerting the ownship aircraft about a possible conflict to avoid inadvertent runway incursion.

Figure 9:
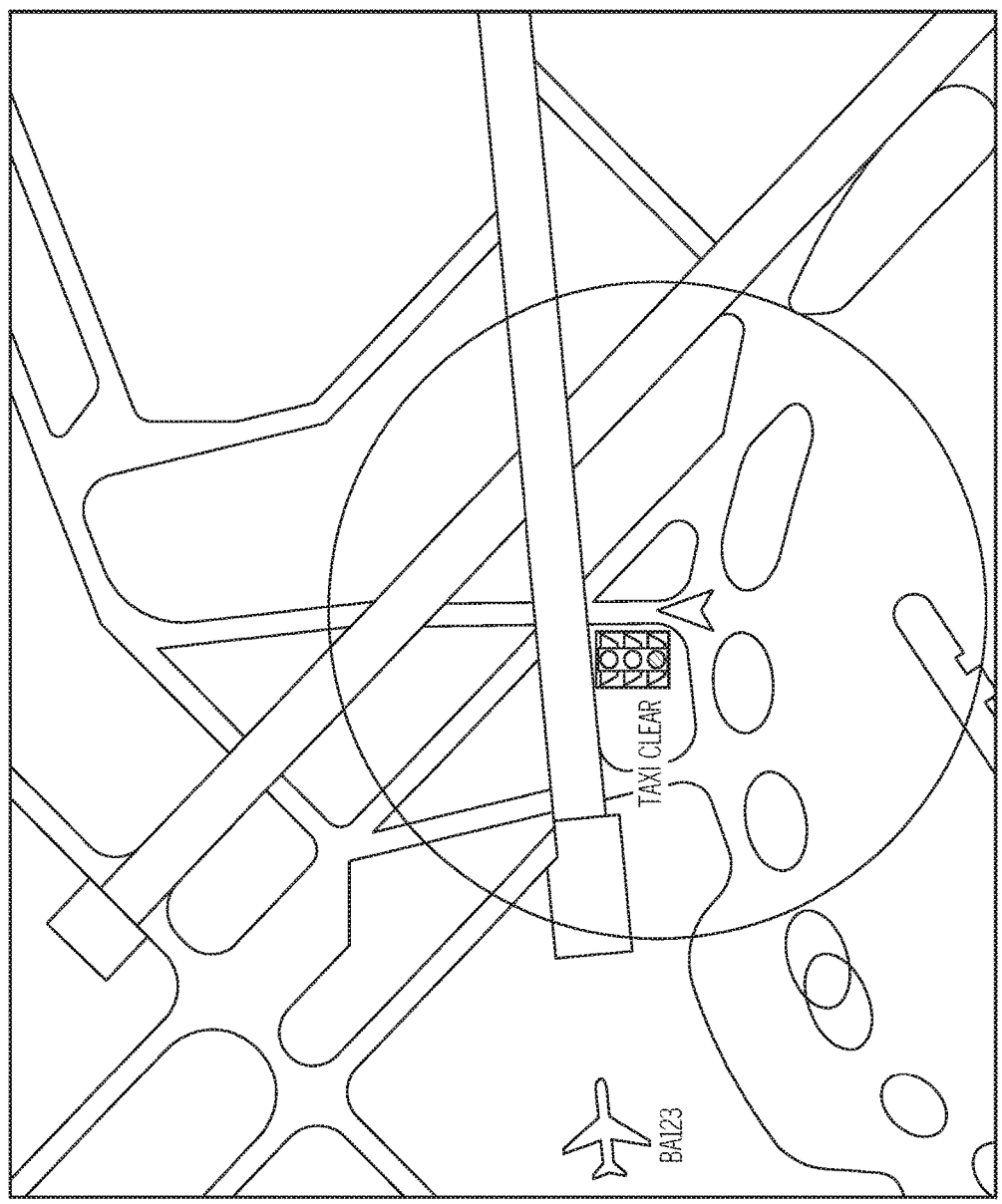

Similarly, as shown in FIG. 9, if the other aircraft ("BA123") is cleared to land by the tower/local controller, but no conflict is detected for the ownship aircraft because the expected touchdown time is more than a threshold value, the incursion or traffic indicator overlaid on the SVS moving map display system will indicate a GREEN light indicating a CONTINUE taxi command, in accordance with any REL non-illumination on the display system.

Figure 10:
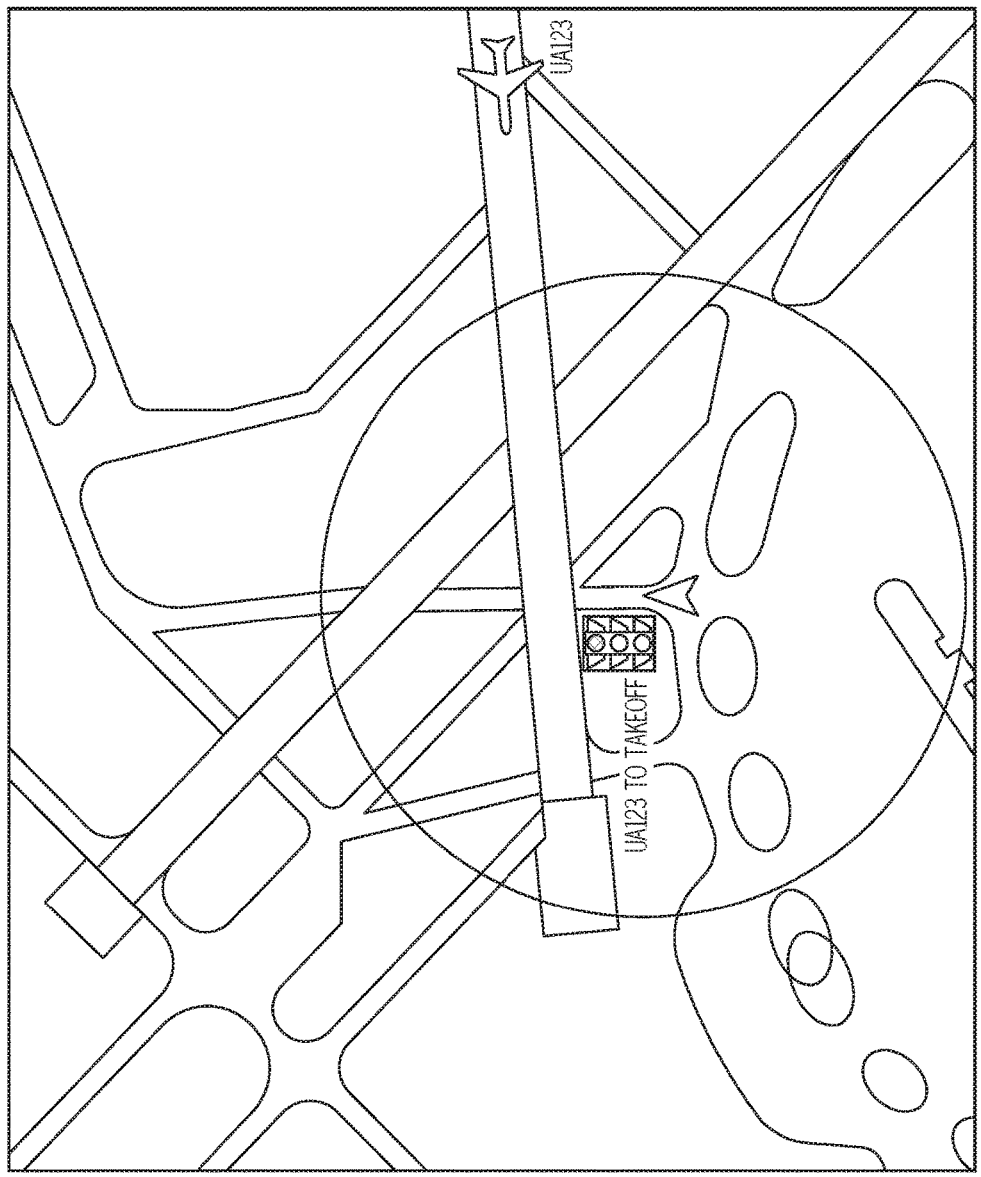

Finally, as shown in FIG. 10, in a similar manner if another aircraft ("UA123") is cleared for takeoff by the tower/local controller and at same time, the ownship aircraft has been cleared to cross the runway by a ground controller (and as confirmed by non-illumination of RELs on the SVS), the system's monitoring of multiple ATC channels will enable the system to detect the possible conflict and alert crew accordingly. Here, the ownship aircraft is alerted to HOLD by the different, overlaid symbology and by providing the conflicting departing traffic information so that it will increase aircrew and passenger safety.

The use cases and the depictions provided here are only exemplary in nature. It should be possible to use different symbology and semantics to accomplish the same concepts described herein.

Figure 11:
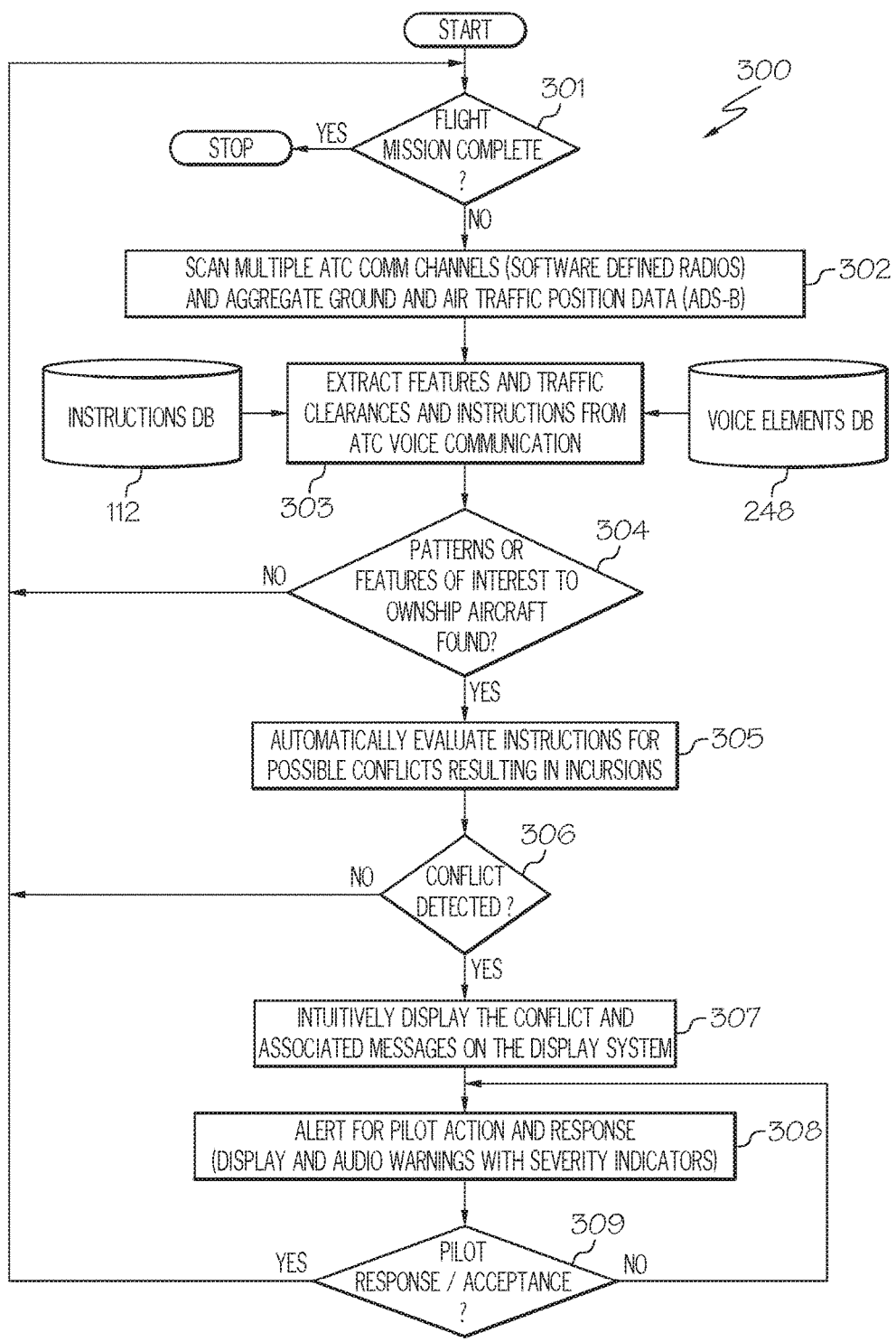
FIG. 11 is a method for providing a flight display for runway incursion avoidance in accordance with the present disclosure.

As per the foregoing disclosure, FIG. 11 is a flowchart illustrating an exemplary method 300 in accordance with some embodiments of the present disclosure. Method 300 begins at the "start" block with a first step 301 of determining whether there is an ongoing flight mission for consideration. If not, the method 300 ends. If so, the method 300 continues to step 302, wherein the above-described communication system 106 is used for scanning multiple ATC communication channel, and this step may also be accompanied by aggregating ground and air traffic position data via an onboard ADS-B system. Thereafter, at step 303, various databases, including those databases 112 and 248, may be appropriately consulted for purposes of accomplishing speech recognition of the various monitored channels, and to extract features and traffic clearances and instructions from the ATC voice communications on those channels. Thus, at decision step 304, it may be determined whether there are any patterns or features of interest to the ownship aircraft. If not, the method 300 reverts to step 301. If so, for example, if another aircraft clearance is detected and transcribed, the system automatically evaluates the instruction/clearance for possible conflicts that may result in incursion, as described above, at step 305. If no conflict is detected, the method 300 reverts to step 301. If, indeed a conflict is detected, the method 300 proceeds to step 306, where the SVS is used to display the conflict, and any associated textual information, using the additional, different, overlaid symbology as discussed above (e.g., "stoplight"). In extensions of this disclosure, at step 308, audio warnings may be provided, and/or severity indicators may be provided on the SVS as to the likelihood or imminence of the incursion. Thereafter, the method 300, at step 309, may monitor for an appropriate pilot response, and proceed as depicted in either case.

Accordingly, the present disclosure has provided improved aircraft display systems, and aircraft display methods, that assist in reducing the incidence of runway incursions. These display methods take into account both ground-based lighting systems and air traffic control communications on various air traffic frequencies. The present disclosure has also provided an autonomous system that can correlate communications information from the various airport traffic controllers on their respective radio communications channels, and other sources, to present to the aircrew with an intuitive display of the runway status. The systems/methods increase pilot efficiency, increase situational awareness, and improve safe and efficient terminal area operations by automatically processing voice instructions from multiple sources and identifying the relevant instructions affecting the ownship aircraft.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. Various changes may be made in the function and arrangement of elements described in an exemplary embodiment without departing from the scope of the invention as set forth in the appended claims.

What is claimed is:

1. A method operable in an ownship aircraft for providing a flight display to an aircrew of the ownship aircraft, the method comprising steps of:

receiving, at a multi-channel radio communications module of the ownship aircraft, at least a first voice transmission on a first radio frequency and a second voice transmission on a second radio frequency that is different than the first radio frequency, wherein the first radio frequency and the second radio frequency are air traffic control frequencies and are each independently selected from the group consisting of: a ground control frequency, a tower (local) control frequency, and an approach control frequency;

automatically, and without input from the aircrew of the ownship aircraft, transcribing, using voice recognition software installed on the ownship aircraft, both the first voice transmission and the second voice transmission into an electronic, textual format, thereby generating a first transmission record and a second transmission record;

automatically, and without input from the aircrew of the ownship aircraft, analyzing both of the first transmission record and the second transmission record for an aircraft clearance, wherein the aircraft clearance pertains to an aircraft other than the ownship aircraft, and wherein the aircraft clearance is selected from the group consisting of: a takeoff clearance, a landing clearance, a runway crossing clearance, and a taxiing clearance;

receiving, at a synthetic vision system (SVS) of the ownship aircraft, a status indication of a ground-based clearance lighting feature in a vicinity or a pathway of the ownship aircraft, wherein the ground-based clearance lighting feature is selected from the group consisting of: runway status lights (RWSL), final approach runway occupancy signal (FAROS) lights, runway entrance lights (REL), takeoff hold lights (THL), and runway intersection lights (RIL), and wherein the status indication is selected from the group consisting of: clear to proceed and not clear to proceed;

displaying, using the synthetic vision system, a display of the status indication of the ground-based clearance lighting feature on a cockpit display to the aircrew of the ownship aircraft in a form of a graphical representation of an environment surrounding the ownship aircraft;

displaying, using the synthetic vision system, an overlaid graphical symbology on the cockpit display corresponding to the status indication of the ground-based clearance lighting feature, wherein the overlaid graphical symbology indicates that the ownship aircraft is either clear to proceed or not clear to proceed, and wherein the overlaid graphical symbology is additional to and different from the display of the status indication of the ground-based lighting feature;

automatically, and without input from the aircrew of the ownship aircraft, determining whether the aircraft clearance that pertains to the aircraft other than the ownship aircraft conflicts with the status indication of the ground-based clearance lighting feature; and based on the step of determining: if there is determined to be a conflict and if the status indication of the ground-based clearance lighting feature is clear to proceed, automatically and without input from the aircrew of the ownship aircraft, using the synthetic vision system, modifying the overlaid graphical symbology to indicate that the ownship aircraft is not clear to proceed; however, if there is not determined to be a conflict or if the status indication of the ground-based clearance lighting feature is not clear to proceed, maintaining the overlaid graphical symbology without modification.

2. The method of claim 1, wherein the step of analyzing both of the first transmission record and the second transmission record for the aircraft clearance that pertains to the aircraft other than the ownship aircraft comprises additionally analyzing for an aircraft clearance that pertains to the ownship aircraft.

3. The method of claim 1, wherein the step of receiving the first voice transmission on the first radio frequency comprises receiving a first voice transmission from a first source selected from the group consisting of: a ground controller, a tower (local) controller, or an approach controller, and wherein the step of receiving the second voice transmission on the second radio frequency comprises receiving a second voice transmission from a second source selected from the group consisting of: a ground controller, a tower (local) controller, or an approach controller wherein the first source is different from the second source.

4. The method of claim 1, wherein the step of transcribing both the first voice transmission and the second voice transmission is performed using an electronic speech processing system that comprises a speech recognition module and a transcription module, wherein the speech recognition module has electronic access to a keywords data store.

5. The method of claim 1, wherein the step of analyzing both of the first transmission record and the second transmission record for the aircraft clearance is performed using an electronic transmission record analysis module.

6. The method of claim 1, wherein the step of receiving the status indication of the ground-based clearance lighting feature further comprises receiving computer-generated images that comprise external scene topography from a flight deck perspective, and that are derived from an aircraft attitude and a database consisting of: terrain, obstacles, and cultural features.

7. The method of claim 1, wherein the step of receiving the status indication of the ground-based clearance lighting feature is performed using a camera selected from the group consisting of: a visible low light television camera, an infrared camera, and millimeter wave (MMW) camera.

8. The method of claim 1, wherein the steps of displaying the display of the status indication of the ground-based clearance lighting feature and displaying the overlaid graphical symbology are performed using a primary flight display of the cockpit display.

9. A flight display system installed in an ownship aircraft for providing a flight display to an aircrew of the ownship aircraft, wherein the flight display system is configured to perform functions of:

receiving, at a multi-channel radio communications module of the ownship aircraft, at least a first voice transmission on a first radio frequency and a second voice transmission on a second radio frequency that is different than the first radio frequency, wherein the first radio frequency and the second radio frequency are air traffic control frequencies and are each independently selected from the group consisting of: a ground control frequency, a tower (local) control frequency, and an approach control frequency;

automatically, and without input from the aircrew of the ownship aircraft, transcribing, using voice recognition software installed on the ownship aircraft, both the first voice transmission and the second voice transmission into an electronic, textual format, thereby generating a first transmission record and a second transmission record;

automatically, and without input from the aircrew of the ownship aircraft, analyzing both of the first transmission record and the second transmission record for an aircraft clearance, wherein the aircraft clearance pertains to an aircraft other than the ownship aircraft, and wherein the aircraft clearance is selected from the group consisting of: a takeoff clearance, a landing clearance, a runway crossing clearance, and a taxiing clearance;

receiving, at a synthetic vision system (SVS) of the ownship aircraft, a status indication of a ground-based clearance lighting feature in a vicinity or a pathway of the ownship aircraft, wherein the ground-based clearance lighting feature is selected from the group consisting of: runway status lights (RWSL), final approach runway occupancy signal (FAROS) lights, runway entrance lights (REL), takeoff hold lights (THL), and runway intersection lights (RIL), and wherein the status indication is selected from the group consisting of: clear to proceed and not clear to proceed;

displaying, using the synthetic vision system, a display of the status indication of the ground-based clearance lighting feature on a cockpit display to the aircrew of the ownship aircraft in a form of a graphical representation of an environment surrounding the ownship aircraft;

displaying, using the synthetic vision system, an overlaid graphical symbology on the cockpit display corresponding to the status indication of the ground-based clearance lighting feature, wherein the overlaid graphical symbology indicates that the ownship aircraft is either clear to proceed or not clear to proceed, and wherein the overlaid graphical symbology is additional to and different from the display of the status indication of the ground-based lighting feature;

automatically, and without input from the aircrew of the ownship aircraft, determining whether the aircraft clearance that pertains to the aircraft other than the ownship aircraft conflicts with the status indication of the ground-based clearance lighting feature; and based on the function of determining: if there is determined to be a conflict and if the status indication of the ground-based clearance lighting feature is clear to proceed, automatically and without input from the aircrew of the ownship aircraft, using the synthetic vision system, modifying the overlaid graphical symbology to indicate that the ownship aircraft is not clear to proceed; however, if there is not determined to be a conflict or if the status indication of the ground-based clearance lighting feature is not clear to proceed, maintaining the overlaid graphical symbology without modification.

10. The system of claim 9, wherein the function of analyzing both of the first transmission record and the second transmission record for the aircraft clearance that pertains to the aircraft other than the ownship aircraft comprises additionally analyzing for an aircraft clearance that pertains to the ownship aircraft.

11. The system of claim 9, wherein the function of receiving the first voice transmission on the first radio frequency comprises receiving a first voice transmission from a first source selected from the group consisting of: a ground controller, a tower (local) controller, or an approach controller, and wherein the function of receiving the second voice transmission on the second radio frequency comprises receiving a second voice transmission from a second source selected from the group consisting of: a ground controller, a tower (local) controller, or an approach controller wherein the first source is different from the second source.

12. The system of claim 9, wherein the function of transcribing both the first voice transmission and the second voice transmission is performed using an electronic speech processing system that comprises a speech recognition module and a transcription module, wherein the speech recognition module has electronic access to a keywords data store.

13. The system of claim 9, wherein the function of analyzing both of the first transmission record and the second transmission record for the aircraft clearance is performed using an electronic transmission record analysis module.

14. The system of claim 9, wherein the function of receiving the status indication of the ground-based clearance lighting feature further comprises receiving computer-generated images that comprise external scene topography from a flight deck perspective, and that are derived from an aircraft attitude and a database consisting of: terrain, obstacles, and cultural features.

15. The system of claim 9, wherein the function of receiving the status indication of the ground-based clearance lighting feature is performed using a camera selected from the group consisting of: a visible low light television camera, an infrared camera, and millimeter wave (MMW) camera.

16. A method operable in an ownship aircraft for providing a flight display to an aircrew of the ownship aircraft, the method comprising steps of:

receiving at least a first voice transmission on a first radio frequency and a second voice transmission on a second radio frequency that is different than the first radio frequency;

automatically, and without input from the aircrew of the ownship aircraft, transcribing both the first voice transmission and the second voice transmission into an electronic format, thereby generating a first transmission record and a second transmission record;

automatically, and without input from the aircrew, analyzing both of the first transmission record and the second transmission record for an aircraft clearance, wherein the aircraft clearance pertains to an aircraft other than the ownship aircraft;

receiving, at a synthetic vision system (SVS) of the ownship aircraft, a status indication of a ground-based clearance lighting feature in a vicinity or a pathway of the ownship aircraft;

displaying, using the synthetic vision system, a display of the status indication of the ground-based clearance lighting feature on a cockpit display to the aircrew of the ownship aircraft in a form of a graphical representation of an environment surrounding the ownship aircraft;

displaying, using the synthetic vision system, an overlaid graphical symbology on the cockpit display corresponding to the status indication of the ground-based clearance lighting feature, wherein the overlaid graphical symbology indicates that the ownship aircraft is either clear to proceed or not clear to proceed, and wherein the overlaid graphical symbology is additional to and different from the display of the status indication of the ground-based lighting feature;

automatically, and without input from the aircrew of the ownship aircraft, determining whether the aircraft clearance that pertains to the aircraft other than the ownship aircraft conflicts with the status indication of the ground-based clearance lighting feature; and based on the step of determining: if there is determined to be a conflict and if the status indication of the ground-based clearance lighting feature is clear to proceed, automatically and without input from the aircrew of the ownship aircraft, using the synthetic vision system, modifying the overlaid graphical symbology to indicate that the ownship aircraft is not clear to proceed; however, if there is not determined to be a conflict or if the status indication of the ground-based clearance lighting feature is not clear to proceed, maintaining the overlaid graphical symbology without modification.

* * * * *